United States Patent
Martin (10) Patent No.: US 10,891,402 B2
(45) Date of Patent: Jan. 12, 2021

(54) ACTIVE SHIELD FOR DETECTING AN INTRUSION ON AN INTEGRATED CIRCUIT

(71) Applicant: NAGRAVISION S.A., Cheseaux-sur-Lausanne (CH)

(72) Inventor: Jean-Marie Martin, Archamps (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 57 days.

(21) Appl. No.: 16/338,272

(22) PCT Filed: Oct. 3, 2017

(86) PCT No.: PCT/EP2017/075045
§ 371 (c)(1),
(2) Date: Mar. 29, 2019

(87) PCT Pub. No.: WO2018/065394
PCT Pub. Date: Apr. 12, 2018

(65) Prior Publication Data
US 2019/0318136 A1    Oct. 17, 2019

(30) Foreign Application Priority Data

Oct. 4, 2016  (EP) ..................... 16192131

(51) Int. Cl.
*G06F 21/87* (2013.01)
*H01L 23/00* (2006.01)

(52) U.S. Cl.
CPC ............ *G06F 21/87* (2013.01); *H01L 23/576* (2013.01)

(58) Field of Classification Search
CPC combination set(s) only.
See application file for complete search history.

(56) References Cited

U.S. PATENT DOCUMENTS

| 4,868,489 | A | 9/1989 | Kowalski |
| 6,496,119 | B1 | 12/2002 | Otterstedt et al. |
| 2009/0077669 | A1* | 3/2009 | Buer ................. G06F 21/86 726/26 |
| 2013/0104252 | A1* | 4/2013 | Yanamadala ........... G06F 21/76 726/34 |
| 2013/0147547 | A1* | 6/2013 | Nalawade ............... G06F 30/36 327/551 |
| 2014/0320151 | A1* | 10/2014 | Filippi ..................... G06F 21/87 324/679 |
| 2015/0007353 | A1 | 1/2015 | Franciscus Widdershoven et al. |
| 2018/0102643 | A1* | 4/2018 | Aubry ................... H01L 25/065 |
| 2018/0166399 | A1* | 6/2018 | Tehranipoor ............ G06F 21/87 |
| 2020/0043869 | A1* | 2/2020 | Yanamadala ...... G01R 31/2884 |

FOREIGN PATENT DOCUMENTS

| EP | 0 542 088 A1 | 5/1993 |
| EP | 2 819 049 A1 | 12/2014 |

OTHER PUBLICATIONS

International Search Report dated Dec. 5, 2017 in PCT/EP2017/075045 filed Oct. 3, 2017.

* cited by examiner

*Primary Examiner* — Nduka E Ojeh
(74) *Attorney, Agent, or Firm* — Oblon, McClelland, Maier & Neustadt, L.L.P.

(57) ABSTRACT

A method and a device for detecting an attack on an integrated circuit. Attacks which are detectable using an active shield as described herein include physical and electrical contacting using a probe and modification of interconnect routing, including modification through the use of focused ion beam technology.

15 Claims, 8 Drawing Sheets figure 1 figure 2 figure 3 figure 4 figure 5 figure 6 figure 7 figure 8 figure 9 figure 10 figure 11a figure 11b figure 12 figure 13 figure 14 figure 15 figure 16

US 10,891,402 B2

ACTIVE SHIELD FOR DETECTING AN INTRUSION ON AN INTEGRATED CIRCUIT

TECHNICAL DOMAIN

The present disclosure generally relates to the domain of integrated circuit security, especially when such security protects against hardware intrusion of the integrated circuit involving removal of a protective layer, probing of the circuit or modification of a routing of a conductive track within the integrated circuit.

BACKGROUND

Security modules and the like may be realised in the form of an integrated circuit. Such security modules are vulnerable to attack by either probing part of the integrated circuit using a probe tip or the like in order to extract or to modify information concealed therein, such as secret keys. It may also be possible, using focused ion beam (FIB) technology, to deposit metal tracks onto an integrated circuit, thereby creating new conductive paths or tracks. Tungsten is generally used as the deposited metal in such techniques. Furthermore, already existing tracks on the integrated circuit may be cut or otherwise open-circuited. Using a combination of these techniques it is therefore possible to reroute one or more conductive paths within the integrated circuit. By rerouting conductive paths away from areas of interest, parts of the integrated circuit may be opened up at the area of interest to allow for closer inspection and analysis of the circuit as it operates, thus providing further opportunity to extract otherwise secret information from the circuit. Techniques such as this provide an opportunity for a malicious third party to reverse-engineer an integrated circuit and can be said to be an intrusion on the integrated circuit.

The state of the art includes shielding for protecting integrated circuits from such hardware attacks or intrusions. Shielding involves covering a sensitive area of the integrated circuit by conductive lines, usually metal lines. Should an attacker violate the integrity of the shielding in an attempt to access the circuitry beneath the shielding, then such an intrusion may be detected by arranging for a suitable measurement mechanism on the integrated circuit to monitor the integrity of the shielding.

Passive shields are known, and are based on detecting a change in a measurement of an analogue characteristic of the shield. For example, the capacitive load of a shield line can serve as a signature. If the capacitive load of the line changes to be out with an expected tolerance, then an intrusion is inferred.

Active shielding is also known in the state of the art, involving digital techniques as opposed to the analogue techniques used in passive shielding. Generally a sequence of bits is injected into a conductive track on a first part of the shield and it is verified that the sequence can be recovered in an expected manner at another point of the shield, thereby verifying that the routing of the conductive track or tracks has not been intruded upon. Intrusions which are detectable using these methods include open circuits or shorts involving the tracks of the active shield.

BRIEF DESCRIPTION OF THE DRAWINGS

The present disclosure will be better understood thanks to the detailed description which follows and the accompanying drawings, namely:

FIG. 11b, showing some more detail of a part of FIG. 11a;

DETAILED DESCRIPTION

There remains a need for a convenient method for detecting an intrusion on an integrated circuit using an active shield whose presence is not easily detectable by a potential intruder. The shield should be simple to operate for convenient detection of opens, shorts, re-routing of tracks (including re-routing of tracks of the shield itself) and physical intrusion on the integrated circuit, such as by removal of part of the plastic package or removal of part of the passivation layer of the integrated circuit.

An object of the present disclosure, therefore, is to provide an anti-reverse-engineering feature by allowing for an intrusion on an integrated circuit to be detected. Intrusions in this context include probing on a part of the circuit using a conductive probe or rerouting one or more conductive tracks or otherwise modifying the predetermined routing of one or more conductive tracks in the integrated circuit as well as attacks on the integrity of the passivation of the circuit or the packaging around the circuit.

An active shield is disclosed, for detecting a hardware attack (an intrusion) on an integrated circuit. A hardware attack may include contacting a part of the integrated circuit with a probe in order to either read from the circuit or to force a value onto the circuit. Other types of hardware attack include the use of focused ion beam (FIB) technology to modify a part of the circuit. Modifying may include creating open circuits or short circuits or placing contact pads for easier placement of a probe or rerouting or otherwise modifying the predetermined routing of a track. Intrusions may also include attacks on the integrity of the passivation of the circuit or the packaging around the circuit.

The density of signal routing tracks in many modern integrated circuits leads to a phenomenon that different tracks carrying different signals in the integrated circuit are often in close proximity to each other. For this reason there is a propensity for one signal to affect the behaviour of another signal due to the cross-coupling capacitance that exists between two tracks. Although the tracks carry digital signals, they exhibit analogue characteristics and it is these characteristics which are exploited as part of the mechanism described herein for the detection of an intrusion. These effects are particularly apparent in sub-micron integrated circuit technologies such as those which are capable of processing feature sizes down to about 90 nm for example.

As well as being affected by the relative closeness of the two signal tracks, the amount of cross-coupling is also affected by the length over which the two tracks run together. Furthermore, the amount of cross-coupling may also depend on the types of metal from which the two tracks are made. When one of the signals switches state, noise may be injected on the other signal line, causing the other signal to glitch. By glitch it is understood that the signal experiences an electrical spike. By exploiting this phenomenon an attempt can be made to induce a glitch on a target track by injecting a signal on an adjacent conductive track (aggressor track) and then inspecting the target track to see if the glitch was induced as expected. If the glitch is not detected, then the expected cross-coupling must not be present and so it can be assumed that the conductive track must have experienced a modification.

As mentioned above, the capacitive coupling is affected by the spacing between the two signal lines: as the spacing between the target track and the aggressor track is reduced, the mutual coupling capacitive increases. Similarly, the mutual capacitive coupling increases as run-lengths are increased. By run-length it is meant the length over which the target track and the aggressor track remain in sufficient proximity for the parasitic effect to be present. For example, the length over which the two lines remain parallel to each other at a given spacing which is sufficient to create significant mutual capacitive coupling.

As mentioned above, in a reverse-engineering attack, an attacker may attempt to gain knowledge of how a chip (or a part of a chip) is designed. One way is to inspect the chip layer by layer, successively removing layers and working out how they interact with each other to form electronic circuits. Eventually, by stripping and analysing in this fashion the attacker may be able to reconstruct all or part of the circuit of the thus reverse-engineered chip. Another form of reverse-engineering is to analyse the chip as it is functioning. In this way it is sometimes possible for an attacker to extract secret values stored in the chip, such as decryption keys and the like. This type of analysis also involves stripping away layers of (parts of) the integrated circuit. But in this case it is necessary to repair or reconstruct parts of the circuit which may have been damaged during the stripping of a layer in order to ensure that the circuit still functions, thus giving the attacker the opportunity to observe the newly exposed signals in order to try to work out how the circuit works. Repairing may be carried out by using focused ion beam technology. For example, an attacker may have to remove a number of metal tracks on an upper layer in order to expose the circuitry beneath. By using focused ion beam technology (FIB) the attacker may repair the tracks which were removed by laying down metal to reconnect the broken tracks. Usually the attacker would re-route the tracks in such a way that the circuitry below remains exposed. This generally results in longer routes than the predetermined (original) routing using wider tracks and usually with significantly larger spacing between tracks because FIB technology does not allow for such precise routing as integrated circuit manufacturing technology. Furthermore, the metal laid down by FIB technology is usually tungsten, which has significantly different electrical properties from the original metal tracks of the circuit, including capacitive and resistive properties. For all of these reasons, including the fact that the pitch and width of the repaired tracks cannot be as fine as the original ones, the mutual coupling capacities between signals lines which have had repairs performed on them in this type of fashion will invariably be affected, usually resulting in a significant loss of mutual coupling between the tracks.

In an embodiment described herein, the integrated circuit comprises a driver for driving a first conductive path of the active shield. Conductive paths in integrated circuits include paths for propagating a signal from one part of the circuit to another, paths through the substrate and may even include polysilicon paths which are generally used for transistor gates. In the present disclosure the conductive paths of interest are those which transport a signal from one part of the circuit to another. Such paths in integrated circuits are usually made of metal and are known as conductive tracks. The integrated circuit further comprises a second driver for driving a second conductive track of the active shield. The second conductive track has a predetermined routing within the integrated circuit. The first conductive track is physically separate from the second conductive track and the two conductive tracks are capacitively coupled to each other by virtue of their physical relationship to each other, where at least part of one track lies sufficiently close to at least part of the other and over a sufficient length for the resulting mutual capacitive coupling to be significant enough for a signal on one track to influence the electrical behaviour of the other and the detection method involves driving a signal on the second track while the first driver is held static and monitoring the first track to see if it is influenced by the first track as expected, through the capacitive coupling.

The active shield is configured to generate a predetermined number of test pulses on the second conductive track during the period while the first driver is held static. This period is called the detection phase. The active shield is further configured to detect glitches on the first track, caused by the pulses on the second track through the mutual coupling. In some embodiments the glitches may be resolved to pulses, the active shield further comprising a pulse counter configured to count the number of thus-resolved pulses. The active shield may further be configured to compare the number of pulses on the first conductive track with the number of test pulses and to provide an error signal when the comparison is negative. An error signal indicates that an attacker has attempted to either contact the integrated circuit electrically or has attacked the packaging or the passivation or has tried to modify the predetermined routing of one or other of the conductive tracks of the active shield.

An active shield, as disclosed herein, physically covers all or part of the circuit it is intended to protect. An attacker (intruder) aiming to gain knowledge about a circuit lying below the active shield will therefore be obliged to touch the shield in some way, usually creating an opening in the shield by cutting the tracks of the shield and re-routing the connections of the cut tracks of the shield to maintain their previous connectivity while providing a physical opening allowing to access the circuitry beneath.

According to a first aspect, provision is made for an integrated circuit, an active shield for detecting an intrusion on the integrated circuit, the active shield comprising:
 a first driver to drive a first conductive track having a first predetermined routing within the integrated circuit; and
 a second driver to drive a second conductive track having a second predetermined routing within the integrated circuit;
wherein at least a part of the second conductive track lies adjacent to a part of the first conductive track at a given spacing and over a given length of the two conductive tracks, the given spacing and the given length being such that a rising or falling edge of a pulse generated on the second conductive track causes a glitch to appear on the first conductive track due to a resulting mutual capacitance between the first and second conductive tracks; characterised in that the active shield is configured to:
 drive a first number of test pulses on the second conductive track during a detection phase; and
 detect for glitches on the first conductive track during the detection phase and to compare a number of detected glitches with a number of expected pulses, the number of expected pulses being related to but not exceeding the first number of test pulses.

According to another aspect, there is provided a method for detecting a hardware attack on an integrated circuit, the integrated circuit comprising:
 a first driver to drive a first conductive track having a first predetermined routing within the integrated circuit; and
 a second driver to drive a second conductive track having a second predetermined routing within the integrated circuit;
the first driver having an output impedance which is significantly higher than an output impedance of the second driver;
wherein at least a part of the second conductive track lies adjacent to a part of the first conductive track at a given spacing and over a given length of the two conductive tracks, the given spacing and the given length being such that a rising or falling edge of a pulse generated on the second conductive track causes a glitch to appear on the first conductive track due to a resulting mutual coupling capacitance between the first and second conductive tracks;
the method comprising:
 driving a number of test pulses on the second conductive track during a detection period over which the first driver remains steady; and
 counting a number of glitches on the first conductive track and comparing the number of glitches with an expected number of pulses, the expected number of pulses being related to but not exceeding the number of test pulses.

Figure 1:
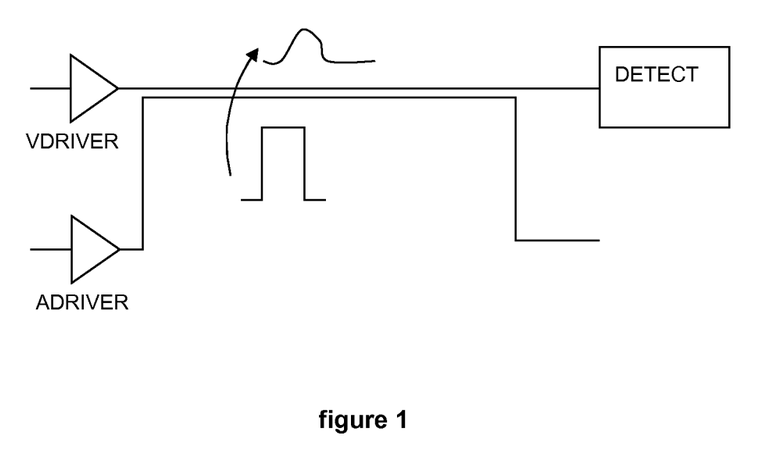
FIG. 1, showing a schematic of a system including electronic circuits exhibiting the basic concept of error state detection according to an embodiment disclosed herein.

FIG. 1 shows the basic concept used in embodiments of integrated circuit hardware attack detectors described herein. FIG. 1 shows a first conductive track for a first signal, the track known as a victim track or a victim line, and a second conductive track for a second signal, known as an aggressor track or an aggressor line. It is arranged for the victim track to be held at some DC value or left floating at least during a detection phase and for the aggressor track to carry at least one pulse during the detection phase. These pulses are also known as test pulses. It is preferable that the victim track be in a high-impedance state during the detection phase, but at least it should be static. These conditions are met when the track is left floating. In the case where the track is driven to a DC voltage, this voltage may be any convenient value such as ground, a positive or negative power supply level, an intermediate level or a boosted level. Drivers used to drive the victim track to its DC level should preferably have a high enough output impedance to allow the voltage level of the track to be influenced via capacitive coupling to a neighbouring track whose level changes. The victim track and the aggressor track are arranged to lie adjacent to each other and close enough to each other over a sufficient distance such that a mutual capacitive coupling between the two tracks is sufficiently high for a perturbation or glitch to be caused on the victim track due to the presence of the pulse on the aggressor track. A detector is further provided to detect whether the victim track experiences the perturbation during the detection phase.

According to an embodiment, the victim track is driven by a victim state generator having an output buffer to hold the victim track at a DC value during the detection phase, the buffer being weak enough such that the any perturbation experienced on the victim track is not immediately absorbed by the output buffer. In another embodiment this buffer may be a tri-state buffer whose output may either depend on the state of its input or whose output may be set to provide a high enough impedance for the victim track to be considered open-circuited or floating.

An embodiment of a detector for detecting perturbations on the victim track may include a buffer to shape the perturbation into a pulse which can be used to cause a counter to increment or decrement. A perturbation, or glitch, has height and a width or duration. When the combination of these two parameters is sufficient this can cause a logic gate to change state. An embodiment of the detector may therefore further include a counter (victim pulse counter) for counting pulses caused by the perturbations or glitches on the victim track. In this embodiment, for a predetermined number of pulses generated on the aggressor track, by an aggressor pulse generator for example, if the same number of pulses is detected by the victim pulse counter, then it may be deduced that the mutual capacitance between the aggressor track and the victim track is still high enough to cause the pulses on the aggressor track to affect the victim track and so it may be assumed that the predetermined routing of the two tracks has not been altered and that it is likely that no intrusion has been made. According to an embodiment, the aggressor pulse generator includes an output buffer which is strong enough to ensure that enough current is produced at the edge of the pulse where the switching occurs to ensure the presence of a glitch on the victim track due to the capacitive coupling between aggressor and victim tracks. In the case where no intrusion has been made it is expected that the number of pulses detected be equal to the number of test pulses. It can be said in this embodiment that the number of expected pulses is equal to the number of test pulses. Where an intrusion has been made resulting in a reduction in capacitive coupling between the victim and aggressor tracks the number of pulses detected may be zero or some number which is less than the number of test pulses.

Figure 2:
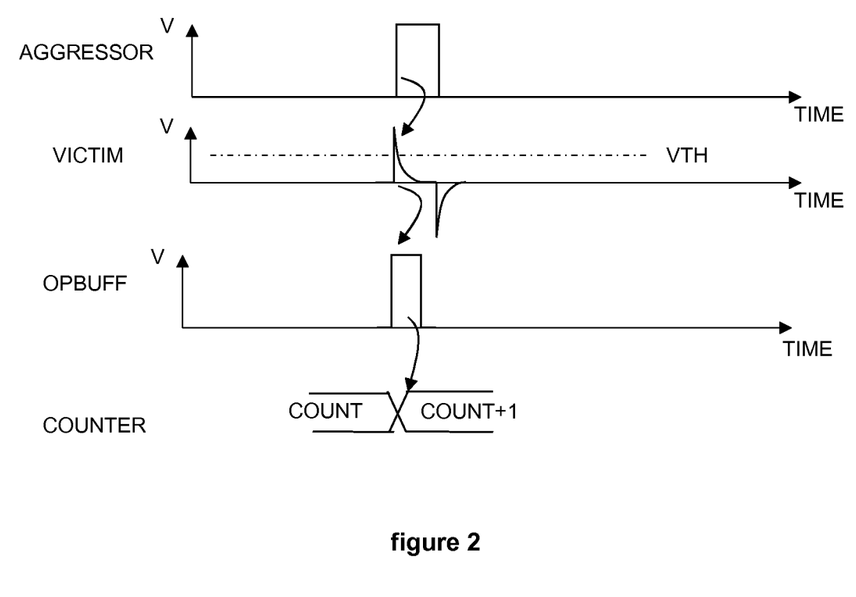
FIG. 2, showing a timing diagram of how a victim track may be affected by a pulse on an aggressor track in an embodiment described herein.

By way of example, in an embodiment, the victim line is either driven to a DC level towards ground or held in tri-state (open-circuit) during the detection phase. By mutual coupling due to the inherent parasitic capacitance between the aggressor line and the victim line, the rising edge of a positive pulse on the aggressor line causes a positive glitch on the victim line, which falls back towards ground after a finite time. Similarly, the falling edge of the pulse on the aggressor line causes a negative glitch on the victim line, which then decays back towards zero. The positive glitch, if it has a height which is higher than a gate threshold and a width which falls within the bandwidth of the gate, then the glitch can be resolved to a pulse by the gate and the pulse can be used to increment a counter. In this manner, if there is sufficient coupling between aggressor and victim, for every pulse on the aggressor line the counter will increment by one. This is shown in FIG. 2.

According to different embodiments, there may be many ways to ensure that the victim line is driven to the required DC state during the detection phase. Preferably, the victim line should have a high enough impedance during the detection period so that the glitch induced by the pulse on the aggressor line is not immediately absorbed. For this reason the line should not be driven to its DC state using a strong buffer. The victim line may be driven by a weak buffer during the detection phase. Alternatively, the victim line may be put into high impedance state by a suitably adapted driver during the detection phase. If the victim line drives a gate of a MOS transistor as part of the detector circuit, this is generally sufficient to further contribute to the high-impedance of the victim line.

In embodiments where the victim track is driven by a driver which can put the victim track into a high impedance state, it is possible that such drivers provide for sufficiently high impedance that the victim track can be considered to be open circuited. In these cases, rather than describing the victim track as being driven to a DC state it suffices to say that the victim track is left in a high impedance state. Different types of buffer are known to be able to achieve this, such as a tri-state buffer for example, which is configured to be able to drive the victim track to one or other of the supply values, just like a normal gate, or to leave the victim track floating (exhibiting very high impedance towards either of the power supplies). With the victim track being "driven" to this high-impedance state from one end, and then driving a CMOS gate, for example, on the other end, the victim track can be considered to be open-circuited. Using this type of driver to drive the victim track provides the advantage that the best glitch size in terms of height and width can be achieved due to the cross-coupling capacitance effect between aggressor track and victim track. In these embodiments, when not in the detection phase, the victim track may be driven in such a way as to convey a digital signal as would any other track in a digital circuit in order not to attract suspicion of a would-be intruder. Then, only during the detection phase, the victim tracks are caused to float in open-circuit so that the coupling effect to the aggressor track (or tracks) may be maximized during that phase.

Buffers which drive aggressor tracks in embodiments as described herein, on the other hand, should preferably be strong buffers in order to be able to drive the aggressor tracks with high enough current and with a high enough slew rate to be able to influence their respective neighbouring victim tracks.

Figure 3:
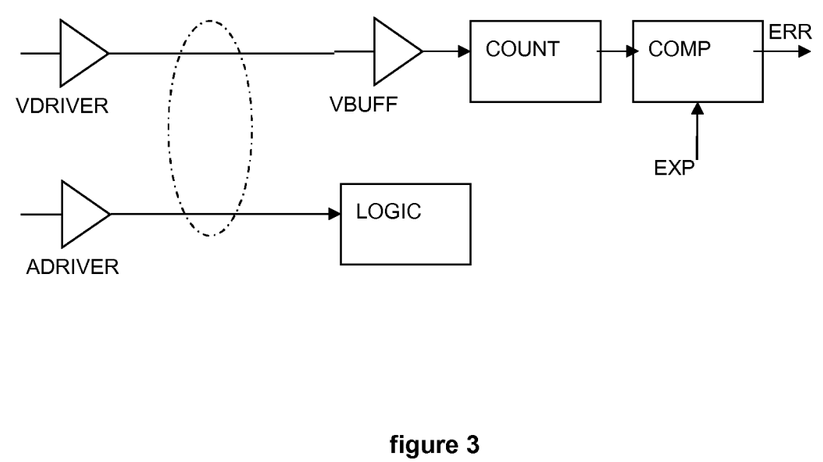
FIG. 3, showing a schematic of a system including electronic circuits arranged to perform error state detection according to an embodiment disclosed herein.

According to another embodiment, in order to provide further security, the system described above further comprises an aggressor pulse counter for counting the number of pulses generated on the aggressor track. In this manner the number of pulses actually generated on the aggressor track can be counted and compared with the number of test pulses (the number of pulses actually driven onto the aggressor track). If there is not a match between these two values, then it may be assumed that the predetermined routing of the aggressor track may have been altered, probably open circuited or short circuited somewhere between the aggressor pulse generator and the aggressor pulse counter. According to the embodiment, a comparison may be made between the value of the aggressor pulse counter and the victim pulse counter, where it may be assumed that an intrusion has occurred if these values do not match. FIG. 3 shows an example of an active shield where the aggressor track has an aggressor pulse counter and the victim track has a victim pulse counter. An intrusion can be assumed to have taken place either if the victim pulse counter and the aggressor pulse counter show different values or if the number of pulses indicated by either of the aggressor pulse counter or the victim pulse counters is different from the number of aggressor pulses.

It can be said therefore that an active shield according to an embodiment described herein comprises a first circuit comprising a victim track having a first predetermined routing, the victim track driven by a victim state generator configured to hold the victim track at a steady state during a detection phase. A steady state may include a high-impedance state. The active shield further comprises a second circuit having an aggressor track having a second predetermined routing, the aggressor track driven by an aggressor pulse generator for generating a predetermined number of aggressor pulse(s) during the detection phase; the first and second predetermined routings having a relative proximity to each other over a given distance such that a pulse on the aggressor track causes a glitch on the victim track, the glitch having a sufficient height and a sufficient width to cause a logic gate driven by the victim track to change state, the first circuit further comprising a victim pulse detector to count a number of victim pluses and to compare the number of victim pulses with the predetermined number of aggressor pulses. The predetermined number of aggressor pulses is equal to the expected number of victim pulses in this case.

Figure 4:
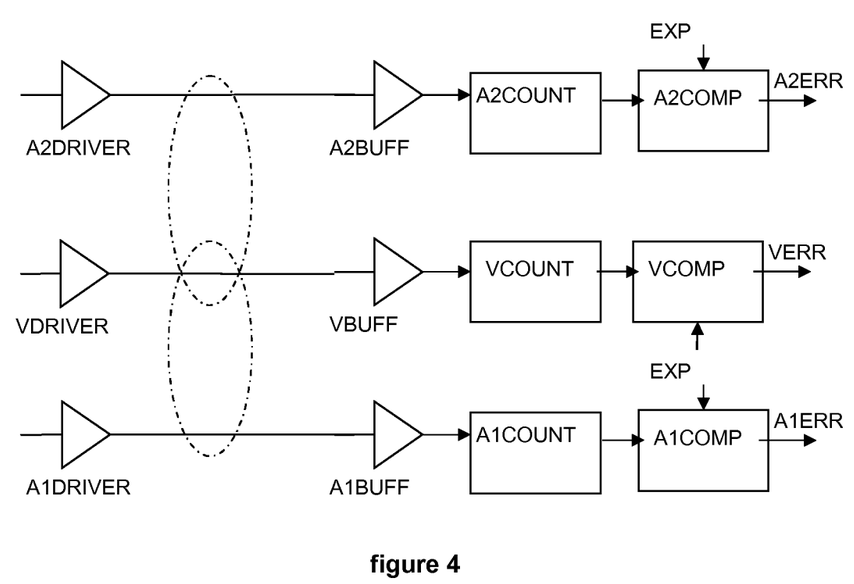
FIG. 4, showing a schematic of a system including electronic circuits arranged to perform error state detection according to another embodiment disclosed herein.

Embodiments of the active shield described herein may comprise more than one aggressor track. According to an embodiment a victim track is surrounded on either side by aggressor tracks. FIG. 4 shows an active shield comprising a victim track, a first aggressor track and a second aggressor track. Physically, a part of the victim track is surrounded on a first side by a part of the first aggressor track over a distance (d) and on a second side by a part of the second aggressor track over the distance (d). This configuration may result in the three tracks being parallel to each other. Preferably, a small spacing exists between the first aggressor track and the victim track and between the second aggressor track and the victim track. It is convenient to use the minimum metal to metal spacing for the layer in which the tracks lie as defined by the particular integrated technology circuit is used as this ensures the maximum amount of cross coupling capacitance between the victim track and each of the aggressor tracks. Other spacings are also allowed as long as sufficient mutual capacitive coupling can be maintained. Since the technologies generally used by attackers to reroute tracks cannot achieve the same minimum spacing between tracks as that allowed by the integrated circuit technology, ensuring minimum spacing between tracks of the shield ensures a maximum change in capacitance should an attacker attempt to reroute a track of the shield, thereby ensuring that the attack or intrusion will be detected, although other spacings are also allowed as long as the required mutual capacitance can be maintained and preferably lower than a minimum spacing achievable by.

In this embodiment, the shield is configured such that during a detection phase the victim track is held static and a predetermined number of test pulses (aggressor pulses) are driven simultaneously on both aggressor tracks. The shield includes an output buffer on the victim track to resolve into victim pulses any glitches caused by the aggressor pulses on the aggressor tracks. The shield is adapted to count the number of victim pulses and to compare this value with an expected number of aggressor pulses. If there is no match, then an intrusion is signaled.

Preferably the victim track is driven by a weak buffer and the aggressor tracks are driven by strong buffers at least during the detection phase. The victim track may be held in a high-impedance state during the detection phase. As mentioned above, the victim track has an output buffer before the counter in order to resolve glitches into proper digital signals. In some embodiments the aggressor tracks may also each include an output buffer.

As described above, variations are possible in embodiments where a victim track is surrounded (sandwiched) by two aggressor tracks, where the aggressor track drives a counter to ensure that the actual number of pulses detected on the aggressor track is equal to the number of pulses actually driven onto the aggressor track. No intrusion is inferred if the victim pulse counter and the aggressor pulse counter are equal to the predetermined number of pulses. The amount of cross-coupling between aggressor and victim tracks of shields according to the present disclosure is affected by the distance between the two tracks, the material (usually metal) from which the tracks are made, the thickness of the tracks, the dielectric material between the tracks and the length over which the aggressor and victim tracks lie in close proximity. It is to be noted that an attack where a re-routing is made using FIB technology usually amounts in the re-routing being made in tungsten, which has very different capacitive properties to the original tracks.

Embodiments where a victim track is surrounded by an aggressor track on each side of the victim track present the advantage that more coupling capacitance can be induced between the aggressors and the victim, especially when both aggressor tracks are driven in the same way as each other. Further advantage can be gained when more sophisticated patterns are used for driving the aggressor tracks, thereby allowing for different types of intrusions to be detected during the detection phase. Furthermore, different types of skews or pulse arrangements between the signals on the aggressor tracks can be introduced in order to confuse an intruder who suspects that the tracks are being used as part of an active shield.

In embodiments where the two aggressor tracks are driven in a synchronised fashion during the detection phase, each pulse on the aggressor tracks is expected to result in a glitch on the victim track. In this case when the number of pulses detected on the victim track is equal to the number of pulses generated on the aggressor tracks (the predetermined number of pulses) it is inferred that an intrusion has not occurred. In embodiments where the aggressor tracks also have counters, when the number of pulses detected on the aggressor tracks is equal to the predetermined number of pulses then this provides a further check that an intrusion has not resulted in an aggressor track being open-circuited or short circuited.

In embodiments where a victim track is surrounded by an aggressor track on either side, the advantage of higher cross-coupling capacitance is lost if the signals driving the two aggressor tracks become skewed above a certain limit. For example, it has been observed in some cases that if rising edges (or falling edges) on the aggressor tracks are not sufficiently synchronised, this can result in insufficient coupling to produce a glitch on the victim track having a height and a width (duration) which is sufficient to be resolved into a pulse. For example, in some integrated technologies it has been observed that a skew of about 0.2 to 0.3 nanoseconds between corresponding edges of pulses on pairs of aggressor tracks is enough to reduce the cross-coupling effect to below that which is necessary to generate a strong enough glitch to be considered a pulse. In other technologies this skew can be anywhere between about 01 ns and 07 ns. In general a skew above 1 ns ensures that the victim track does not experience the glitch.

Figure 5:
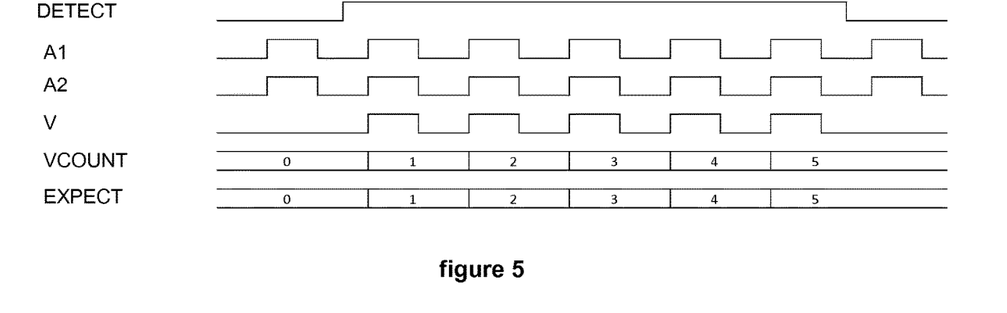
FIG. 5, showing a timing diagram for use in a system according to an embodiment disclosed herein.
Figure 6:
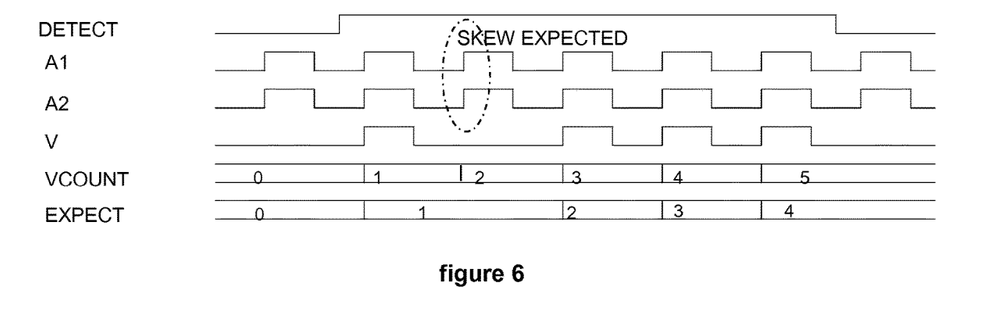
FIG. 6, showing another timing for use in a system according to another embodiment disclosed herein.

It is therefore possible, through careful control of the timing of the pulses on the two aggressor lines to modify the expected number of pulses so that if the potential intruder figures out how the shield works he will not realise that not all of the observed pulses are to be considered when calculating the expected number of pulses. Only pulses which are not skewed are to be considered and it is difficult for the potential intruder to be able to detect such small skews. For example, in FIG. 5 the two aggressor signals are synchronised and each pulse on an aggressor line is expected to produce a glitch on the victim line. It can be said that each pulse on an aggressor line contributes to the value of the expected number of pulses. In FIG. 6 however, the expected number of pulses is less than the number of pulses generated on either of the aggressor lines because one or more of them are intended to be skewed such that their combined effect is not enough to produce a glitch of the required height and width on the victim line to be resolved to a pulse. The expected number of pulses on the victim line is therefore less than the actual number of pulses observable on either of the aggressor lines. In this example, the victim counter records more than the expected number of pulses, thereby indicating that the intended skew was not present and that an intrusion must have been made to generate pulses without the expected skew.

In embodiments which use the skew effect described above the active shield may further comprise a programmable skew generator to selectively generate a skew between one or more edges of the pulses on the two aggressor lines. The actual number of pulses on the aggressor lines (number of test pulses) will be higher than the expected number of pulses by the number of otherwise potentially glitch-producing edges over which a skew has been introduced. For example, where rising edges of aggressor pulses are meant to produce glitches on the victim line, if ten pulses are generated but the rising edges of two of the pulses are skewed as described above, then only eight of the pulses will be expected to produce glitches. In this case the expected number of pulses is eight.

Figure 7:
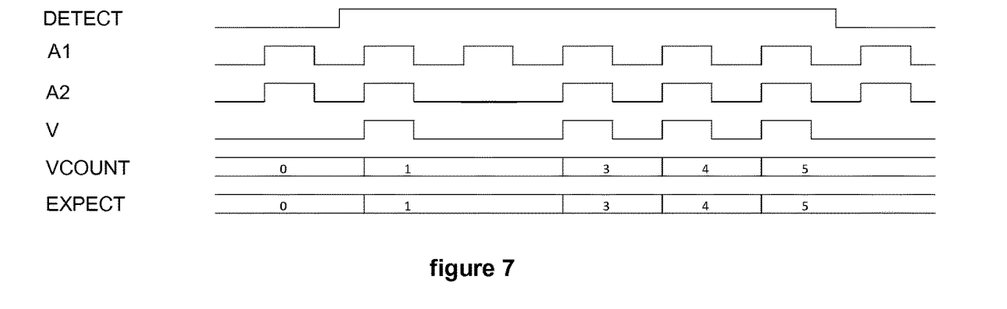
FIG. 7, showing still another timing diagram for use in a system according to an embodiment disclosed herein.

Instead of acting upon the skew between the edges of the pulses on the aggressor lines, it is possible to drive the aggressor lines using different patterns of pulses, the pulses being properly aligned (in sync and not skewed) whenever they are present on both lines. This is shown in FIG. 7 for example. Here the aggressor lines are driven with synchronised pulses, except for some moments when only one of the aggressor lines has a pulse. At those moments it is not expected for the victim line to experience a glitch of height and width which is significant enough to be resolved to a pulse and so the expected count of pulses on the victim line is correspondingly modified. For example, in FIG. 7 one aggressor line shows 4 pulses and the other aggressor shows 4 pulses, but since only three of the pulses on both lines appear at the same time, the expected count of pulses on the victim line is 3. This embodiment has the advantage that it can detect that the victim line has not been shorted to either of the aggressor lines (or to each other).

In an embodiment having one aggressor track for a corresponding victim track it is said that the active shield further comprises an aggressor pulse counter to count the number of aggressor pulses. An error may be signaled when the number of aggressor pulses (i.e. detected pulses on the aggressor track) and the number of test pulses are different. An error may also be signaled when the number of victim pulses is different from the number of test pulses, or different from the number of aggressor pulses. In embodiments where two aggressor tracks correspond to a single victim track it is the number of expected pulses which is used, the number of expected pulses related but not exceeding the number of test pulses driven onto either of the aggressor lines. Here, both aggressor lines may include counters to check that the pulses which were driven on the aggressor lines reach their destination as described above. Any mismatch between aggressor pulses and test pulses or victim pulses and expected pulses indicates an intrusion.

Figure 8:
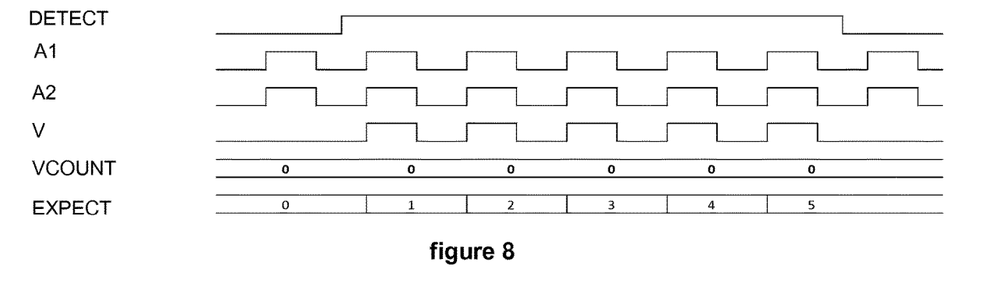
FIG. 8, showing yet another timing diagram for use in a system according to an embodiment disclosed herein.

FIG. 8 shows an example of a timing diagram from an embodiment where both aggressor lines carry a number of pulses but the victim counter remains unchanged. This can happen when either of the aggressor lines or the victim line has been subjected to a rerouting which breaks or otherwise significantly lowers the coupling capacitance brought about by the proximity of the originally-routed lines within the integrated circuit. The intrusion is thus detected.

In embodiments which use the effect described in the above two paragraphs, the active shield may further comprise a programmable pulse inserter to insert one or more extra pulse on one of the two aggressor tracks or a programmable pulse suppressor to suppress one or more pulses on one or other of the aggressor tracks. The actual number of pulses on either of the aggressor lines will then be higher than the expected number of pulses by the number of inserted and/or suppressed pulses. For example, if the pulse inserter adds an extra pulse on one of the aggressor lines, then the extra pulse does not contribute to the expected number of pulses. Only the number of aligned pulses between the two aggressor lines contributes to the expected number of pulses.

Figure 9:
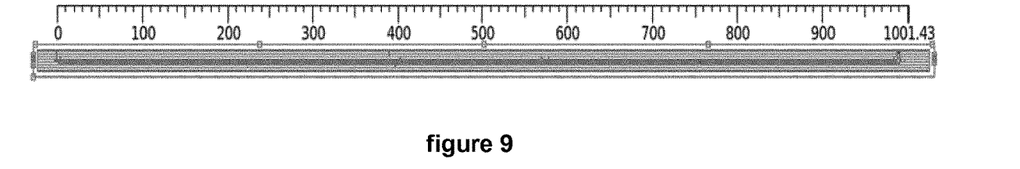
FIG. 9, showing an example layout diagram of a conductive track in an active shield according to an embodiment disclosed herein.

FIG. 9 shows an example of a layout of a shield in 90 nm technology, with a metal track width of 0.54 um and a metal wore spacing of 0.34 um. In this example the length along which the aggressor and victim tracks run together is 1000 um.

Figure 10:
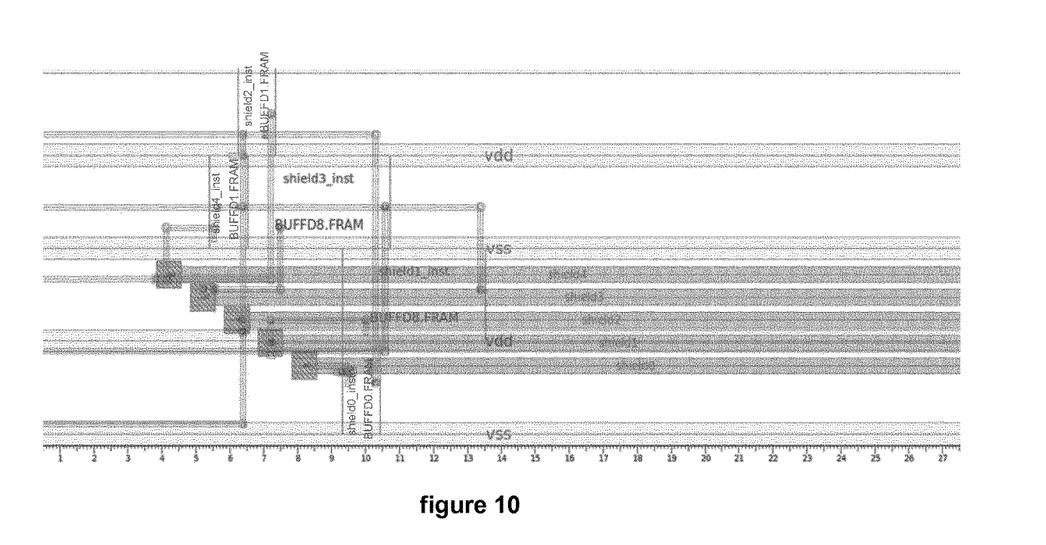
FIG. 10, showing a layout diagram of part of a system including part of a first circuit block and part of a second circuit block in an active shield according to an embodiment disclosed herein.

FIG. 10 shows a layout of a shield according to an embodiment. In this example the victim track has an aggressor track on each side (above and below) and each aggressor has a dummy net on its other side (the side opposite the side which is beside the victim track).

Supply lines VDD and VSS (GND) can also be seen as well as access lines carrying the signals to each of the tracks of the shield.

Figure 11A:
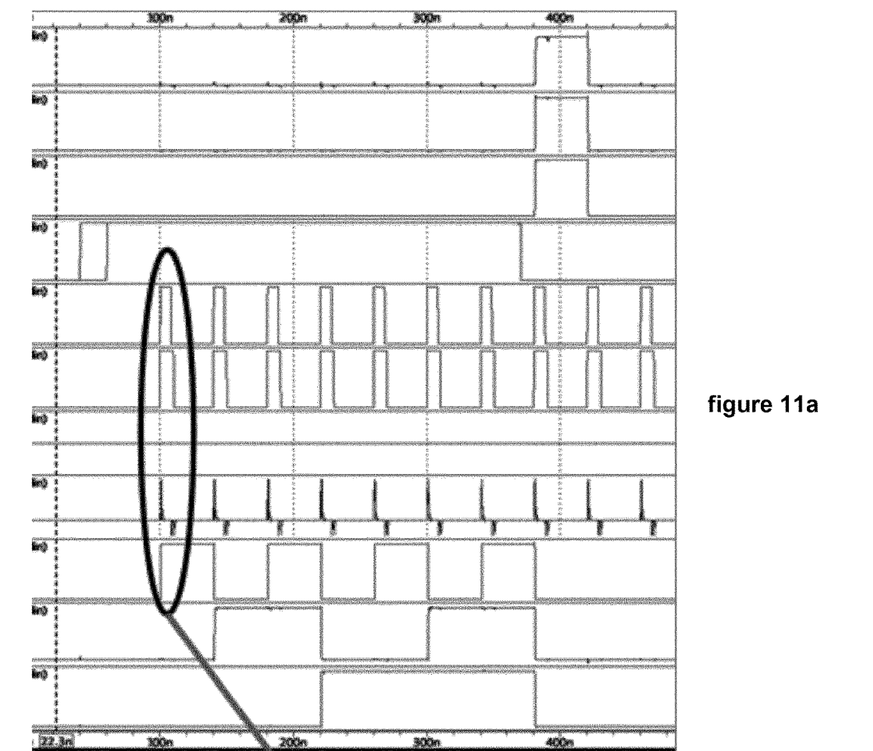
FIG. 11a, showing a picture of a simulation waveform of signals within a system comprising an embodiment of an active shield disclosed herein.
Figure 11B:
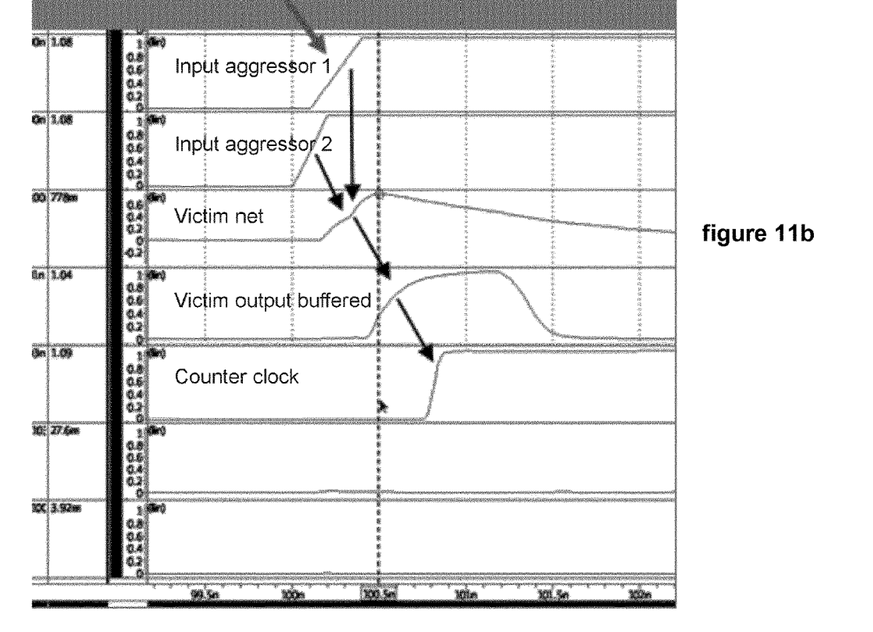

FIG. 11a shows waveforms from a simulation of an embodiment of an active shield described herein. FIG. 11b shows the waveforms in closer detail where the rising edges of the two aggressor tracks can be seen to cause a rising glitch on the victim track, which decays. The output of the victim output buffer is also shown. It can be seen that the glitch has been resolved to a pulse by the buffer. The rising edge of this resolved signal may be used as a clock pulse on a counter (shown) to increment the counter therefore recording the presence of the glitch caused by the pulse on the aggressor tracks.

Figure 12:
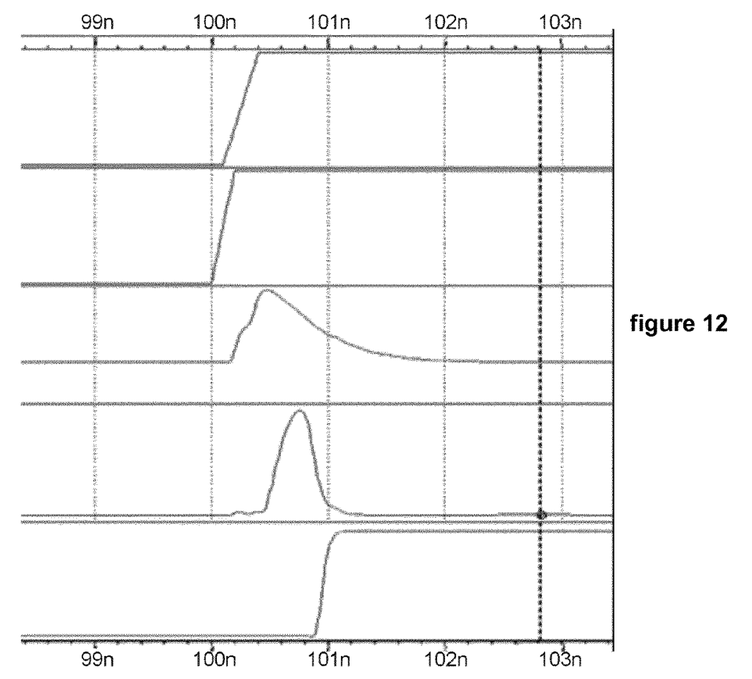
FIG. 12, showing a picture of another simulation waveform of signals within a system comprising an embodiment of an active shield disclosed herein.
Figure 13:
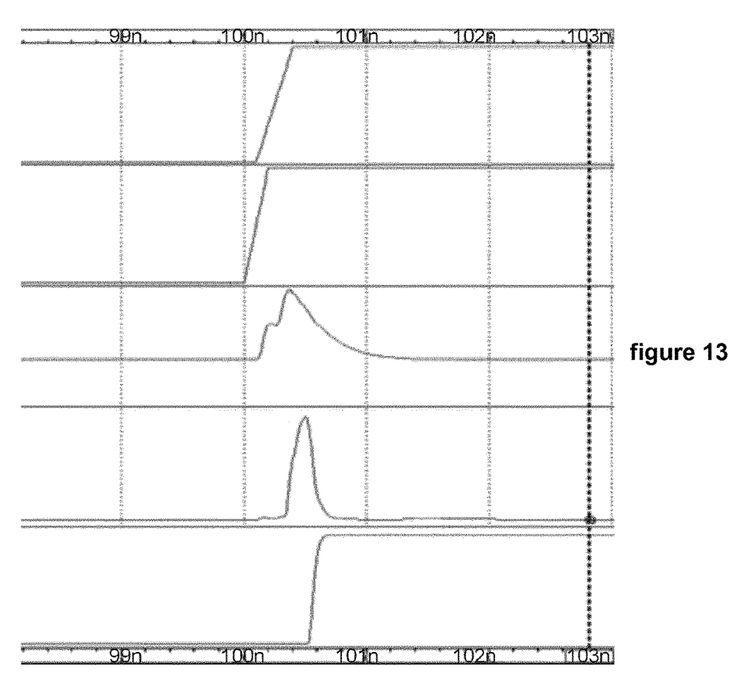
FIG. 13, showing a picture of still another simulation waveform of signals within a system comprising an embodiment of an active shield disclosed herein.

FIGS. 12 and 13 show simulation waveforms where different shapes (heights and widths) of victim track glitches (caused by aggressor track pulses) are shown to be resolved to pulses and accounted for.

Figure 14:
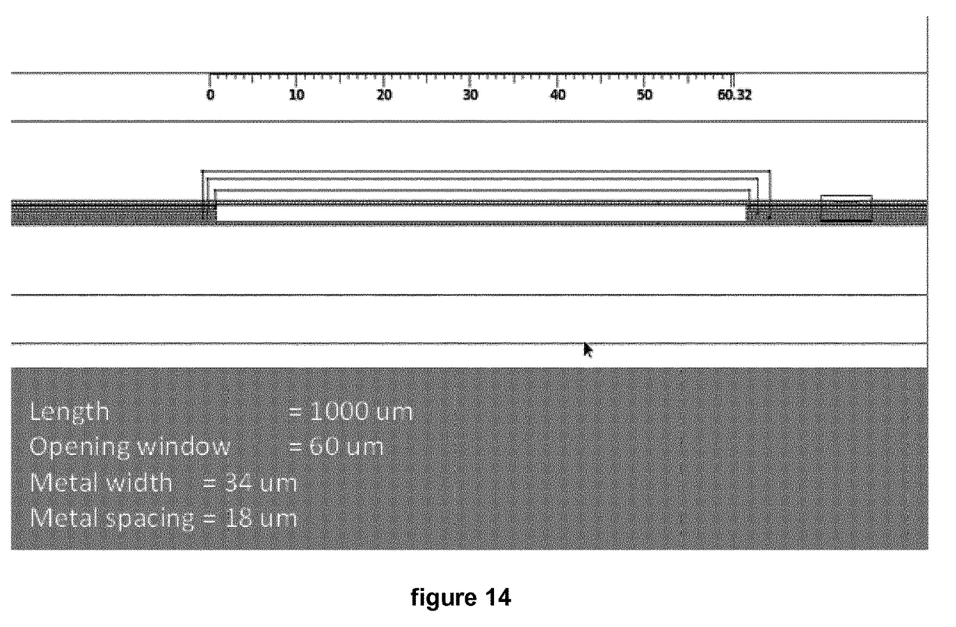
FIG. 14, showing a picture of part of a layout in which an intrusion has been made.

FIG. 14 shows an example of the layout of a part of an integrated circuit on which there was an active shield according to an embodiment described herein. Several tracks of the active shield are shown to have been rerouted. This is typically what would be done by an intruder who wishes to maintain the functionality of the circuit while creating an opening through one of the upper layers of the circuit in order to be able to observe the operation of the circuitry which lies below. Here, it can be seen that three tracks have been re-routed in order to create a hole. However, with the technology available to perform the rerouting, the cross-coupling capacitance which existed between the aggressor tracks and the victim track of the shield has been significantly altered such that pulses on the aggressor tracks no longer cause glitches to appear on the victim track. In this example, which is representative of what may be achieved in a 90 nm technology process, the opening has been created over 1000 um to create a 60 um wide window and the metal width of the re-routed metal is 34 um, with the metal spacing being 18 um. A 30 um to 40 um opening is usually sufficient for an intruder to be able to inspect the circuitry lying below. In embodiments of the shield described herein careful choice of buffer strengths for driving the victim track and the aggressor tracks and of the metal spacing and width and the length or distance over which the victim and aggressor(s) run is made in order to meet the requirement for being able to produce a glitch on the victim track.

Figure 15:
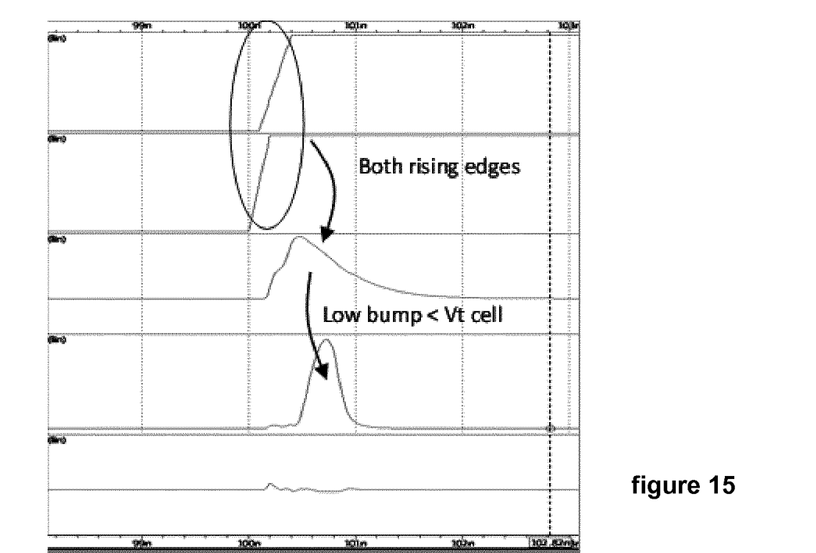
FIG. 15, showing a picture of a simulation waveform of signals within a system comprising an embodiment of an active shield disclosed herein in which an intrusion has been made.
Figure 16:
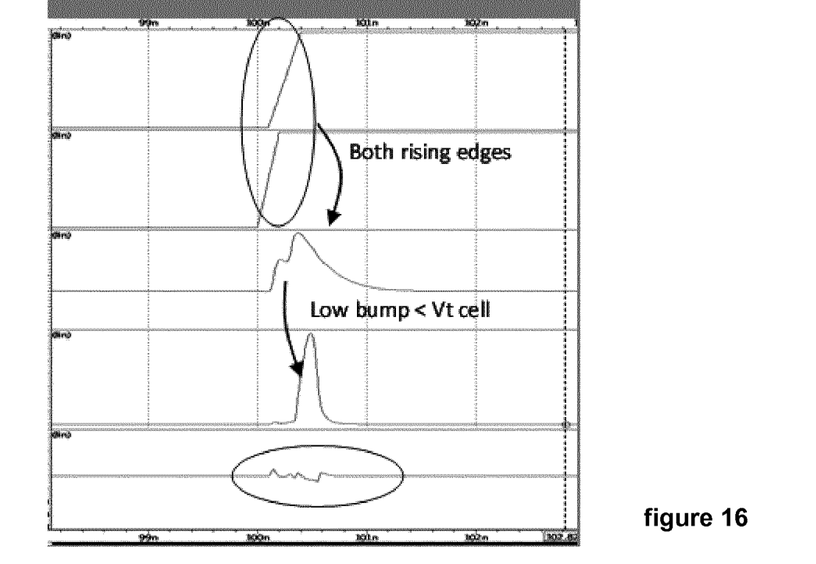
FIG. 16, a picture of another simulation waveform of signals within a system comprising an embodiment of an active shield disclosed herein in which an intrusion has been made.

FIGS. 15 and 16 show simulations under different conditions, where the rising edge of the signal on the aggressor tracks can be seen to produce a small glitch on the victim track, where the height and or width of the glitch are insufficient to be able to be resolved to a pulse. This can happen when an intrusion has been performed on an integrated circuit, especially when the intrusion results in a part of the active shield described herein to be altered (e.g. rerouting).

It has been shown that in some embodiments the victim pulse counter may count the same number of pulses from the victim line as were driven on the aggressor line when no intrusion has been made. It can therefore be said then that the expected number of victim pulses is equal to the number of test pulses (see FIG. 5). In other embodiments, depending on the skews between the edges of the pulses, the number of pulses expected to be detected on the victim line may be less than the number of test pulses (see FIG. 6). In FIG. 6 there is no skew between the aggressor pulses and so the victim pulse counter registers pulses for each of the aggressor pulses, whereas it was intended to introduce a skew where shown. This leads to an error because the expected count is different from the actual count, implying that an intrusion must have been made, Similarly, in other embodiments, the number of expected pulses may be less than the number of pulses generated on either the first aggressor track or the second aggressor track or both (see FIG. 7). It can therefore be said for all embodiments that the expected number of pulses is related to but does not exceed the number of test pulses depending on the embodiment or configuration. The active shield may include a detector to detect the glitches on the victim track during the detection phase and may further include a comparator to compare the number of detected glitches with a number of expected glitches as described above.

A goal in an anti-reverse-engineering mechanism provided by embodiments of the active shields described herein is to avoid that an intruder be able to guess, by inspection, that a part of the integrated circuit is being used as a shield. For example, if an intruder detects that a particular signal, on a track which does not appear to be a DC power supply signal, remains static during the operation of the circuit, then the intruder may suspect that such a track could be part of a shield mechanism. According to an embodiment therefore, it is arranged that the active shield mechanism comprises a detection phase and a non-detection phase. During the non-detection phase the active shield is configured such that the various lines modulate. This is especially true of the victim lines. This prevents an unscrupulous party from being able to easily recognise that the victim lines never modulate and so may be being used as part of a shield mechanism. One way to arrange for this is to have a random signal generator to drive the victim tracks. During the detection phase the victim track is held at a DC level or in a high-impedance state such as a tri-state. In one embodiment the level may be ground, whereas in another it may be a positive or negative power supply level. In another it is in tri-state. It can be said therefore that the victim state generator in such embodiments is configured to provide a modulated or otherwise moving signal during the non-detection phase where the detector does not attempt to detect for a change in the predetermined capacitive coupling between victim and aggressor, and to provide a DC level or high impedance state on the victim signal line during the detection phase when the detector attempts to detect whether the coupling has changed. Another way of saying this is that the victim state generator ensures that the victim track is driven towards a static state during the detection phase and ensures a non-static signal on the victim track out with the detection phase.

In an embodiment where an active shield comprises one victim line and two aggressor lines, one on each side of the victim line, it is arranged that the victim state generator for driving the victim line and the aggressor pulse generators for driving each of the aggressor lines each carry semi-random signals so that an observer would not be able to distinguish these lines as being different from another line in the integrated circuit carrying instructions or data. In this way the observer is not led to suspect that the lines of the active shield serve any purpose other than that of any other line in the circuit, thereby not making the observer aware that these lines may be part of an active shield. During the detection phase, the active shield lines are operated as described in the respective embodiments described above.

It can be said therefore that embodiments of active shields described herein operate according to two phases: a first phase may be called a standby phase or an idle phase or even a non-detection phase where the lines of active shield (aggressor lines and victim lines) are all driven such that they carry digital signals which cause them to appear the same as any other digital signal line; the second phase is the detection phase, during which the victim lines are driven either towards a DC level or left floating and the aggressor lines are driven using some predetermined pattern which will have a predictable influence on the victim lines by virtue of mutual capacitive coupling to the aggressor lines. Whenever the victim lines are not influenced as predicted by the aggressor lines an error may be flagged and the integrated circuit protected by the active shield may then be caused to take action as a consequence, such as erasing any sensitive data for example.

The layout of the aggressor lines and victim lines of active shields as described herein is usually such that the lines occupy the topmost metal layer of the integrated circuit (in the vertical direction), except in cases where the topmost layers are power supply layers. In such cases the lines of the active shield will occupy the first available layer from the top which is not dedicated to carrying power. In this manner the active shield can protect circuitry lying below it because it can detect if an intrusion has been made to allow an attacker to get access to the circuitry below. In the horizontal direction, on a layer which is occupied by the lines of an active shield, the lines are laid out such that an aggressor lone lies next to a victim line. In some embodiments, aggressor lines lie one on either side of the victim line. A series of victim lines may lie in the horizontal direction such that a sequence of aggressor1a, victim1, aggressor1b aggressor2a, victim2, aggressor2b, aggressor3a, victim 3, aggressor3b, etc. . . . .

As is known in the domain of integrated circuits, especially where an integrated circuit is formed on a substrate of a semiconductor material, the integrated circuit is generally covered by a passivation layer in order to seal the circuit and protect it from mechanical, electrical or chemical damage. The passivation layer is generally made from an oxide such as silicon dioxide and can therefore be called a dielectric. Being a dielectric, the passivation layer, where it lies above a part of the integrated circuit which includes an active shield according to an embodiment described herein, has an effect on the mutual capacitive coupling between the conductive tracks lying below. It follows therefore, that such an active shield can also detect an intrusion where the passivation layer becomes damaged. Similarly, integrated circuits are generally housed in packages which are made from plastics materials. Plastics are also dielectric materials and as such their presence above a part of a circuit which has an active shield according to embodiments described herein have an effect on the mutual coupling capacitance of the conductive tracks. Active shield as described herein are therefore also capable of detecting when the plastic protection above has become damaged. It follows that intrusions which can be detected by the active shields described herein include damage to the plastic packaging within which the integrated circuit is held and/or damage to the passivation of the integrated circuit itself.

The invention claimed is:

1. In an integrated circuit, an active shield for detecting an intrusion on the integrated circuit, the active shield comprising:
   a first driver to drive a first conductive track having a first predetermined routing within the integrated circuit; and
   a second driver to drive a second conductive track having a second predetermined routing within the integrated circuit;
   wherein at least a part of the second conductive track lies adjacent to a part of the first conductive track at a given spacing and over a given length of the two conductive tracks, the given spacing and the given length being such that a rising or falling edge of a pulse generated on the second conductive track causes a glitch to appear on the first conductive track due to a resulting mutual capacitance between the first and second conductive tracks;
   wherein the active shield is configured to:

drive a first number of test pulses on the second conductive track during a detection phase; and detect for glitches on the first conductive track during the detection phase and to compare a number of detected glitches with a number of expected pulses, the number of expected pulses being related to but not exceeding the first number of test pulses.

2. The active shield according to claim 1, further comprising an error signal generator to generate an error signal when the number of detected glitches and the number of expected pulses are different.

3. The active shield according to claim 1, wherein the first driver has an output impedance which is significantly higher than an output impedance of the second driver, at least during the detection phase.

4. The active shield according to claim 1, the first driver being a tri-state buffer having at least one low-impedance state and a high-impedance state, the active shield being further configured to switch the tri-state buffer to the high-impedance state during the detection phase.

5. The active shield according to claim 1, wherein the intrusion involves contacting either the first conductive track or the second conductive track by a probe or by an ion beam.

6. The active shield according to claim 1, wherein the intrusion involves performing a modification to the predetermined routing of either or both of the first and second conductive tracks or removing a dielectric covering of the integrated circuit above the active shield.

7. The active shield according to claim 1, further comprising a first aggression pulse counter to count a number of pulses on the second conductive track, the active shield configured to signal an error when the number of pulses indicated by the first aggression pulse counter and the first number of test pulses are different.

8. The active shield according to claim 1, further comprising:
   a victim output buffer to resolve the detected glitches into victim pulses;
   a victim pulse counter to count a number of victim pulses; and
   a comparator to compare the number of victim pulses with the expected number of pulses.

9. The active shield according to claim 1, further comprising a third driver to drive a third conductive track having a third predetermined routing within the integrated circuit, at least a part of the third conductive track lying adjacent to a part of the first conductive track at a second given spacing over a second given length of the first and third conductive tracks such that the second conductive track is sandwiched between the first and third conductive tracks, the second given spacing and the second given length being such that a rising or falling edge of a pulse generated on the second and third conductive tracks causes a glitch to appear on the first conductive track due to a resulting mutual capacitance between the first, second and third conductive tracks, the active shield further configured to drive a second number of test pulses on the third conductive track during the detection phase.

10. The active shield according to claim 9, further comprising a programmable skew generator to generate a skew between at least one edge of at least one of the first test pulses and a corresponding edge of a corresponding second test pulse.

11. The active shield according to claim 10, wherein the first number of test pulses is equal to the second number of test pulses and said skew is generated for a number of edges corresponding to a difference between the first number of test pulses and the expected number of test pulses.

12. The active shield according to claim 9, wherein the first number of test pulses is different from the second number of test pulses, the expected number of pulses differing over the first number of pulses by the difference between the first number of test pulses and the second number of test pulses.

13. The active shield according to claim 1, said conductive tracks forming at least part of an upper layer of the integrated circuit such that a part of the integrated circuit which is to be protected from intrusion lies on a layer situated directly underneath at least a part of said conductive tracks.

14. An integrated circuit comprising an active shield according to claim 1.

15. A method for detecting a hardware attack on an integrated circuit, the integrated circuit comprising:
   a first driver to drive a first conductive track having a first predetermined routing within the integrated circuit; and
   a second driver to drive a second conductive track having a second predetermined routing within the integrated circuit;
   the first driver having an output impedance which is significantly higher than an output impedance of the second driver;
   wherein at least a part of the second conductive track lies adjacent to a part of the first conductive track at a given spacing and over a given length of the two conductive tracks, the given spacing and the given length being such that a rising or falling edge of a pulse generated on the second conductive track causes a glitch to appear on the first conductive track due to a resulting mutual coupling capacitance between the first and second conductive tracks;
the method comprising:
   driving a number of test pulses on the second conductive track during a detection period over which the first driver remains steady; and
   counting a number of glitches on the first conductive track and comparing the number of glitches with an expected number of pulses, the expected number of pulses being related to but not exceeding the number of test pulses.

* * * * *